| United States Patent [19] | [11] | 4,068,339 |
|---|---|---|
| Maruyama et al. | [45] | Jan. 17, 1978 |

[54] FLEXIBLE MATTING

[75] Inventors: Kenjiro Maruyama, Kobe; Tsuyoshi Miki, Osaka; Yoshiyuki Nishi, Amagasaki; Masato Takao, Takatsuki, all of Japan

[73] Assignee: Sumitomo Bakelite Company Limited, Tokyo, Japan

[21] Appl. No.: 637,862

[22] Filed: Dec. 4, 1975

[30] Foreign Application Priority Data

Dec. 5, 1974   Japan ................ 49-146338[U]

[51] Int. Cl.² ........................................... A47L 23/26
[52] U.S. Cl. ........................................ 15/215; 15/187; 15/238
[58] Field of Search .......... 15/112, 187, 188, 215–217, 15/223, 224, 238; 4/185 F; 52/177, 180; 280/164 A; 428/85, 88, 92; D6/209, 213; D7/188

[56] References Cited

U.S. PATENT DOCUMENTS

| D. 173,875 | 1/1955 | Mitchell ............................. D6/209 |
| 1,526,267 | 2/1925 | Dessau ................................. 15/215 |
| 2,908,027 | 10/1959 | McClung ......................... 15/216 X |
| 3,312,583 | 4/1967 | Rochlis ............................ 428/92 X |
| 3,648,320 | 3/1972 | Wooley ............................... 15/217 |
| 3,809,734 | 5/1974 | Watanabe ........................ 428/85 X |
| 3,886,620 | 6/1975 | Miller ................................. 15/217 |

FOREIGN PATENT DOCUMENTS 801,467   9/1958   United Kingdom ............... 15/215

Primary Examiner—Daniel Blum
Attorney, Agent, or Firm—Karl W. Flocks

[57] ABSTRACT

A flexible matting for use at an entrance porch, corridor, veranda, pool-side, interior floor of automobiles, etc. This matting consists of a base on which tread bars and rows of ridges bearing piles are arranged in a definite direction with appropriate spacings between them so that the mud adhered to shoes can be removed by the piles and collected in the grooves formed between the ridges. Thus, the removal of mud from the present matting is very easy as compared with a conventional one.

17 Claims, 16 Drawing Figures

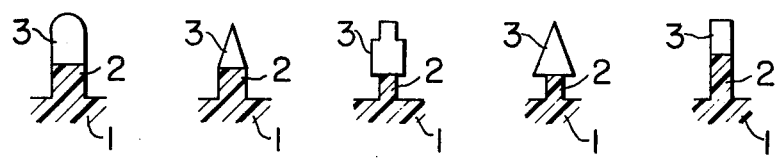
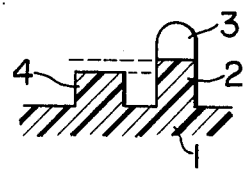 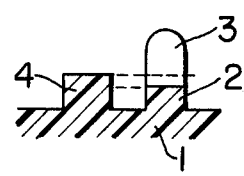

FLEXIBLE MATTING

This invention relates to a flexible matting for use at an entrance porch, corridor, veranda, pool-side, interior floor of automobiles, etc.

There has already been known a matting consisting of a base sheet provided with numerous piles. Such a matting, however, has the disadvantage that the repeated stamping down of the matting renders the piles difficult to recover from deformation until the piles finally stay bent down or even torn off. With the conventional matting, moreover, it is difficult to remove the mud embedded among the piles.

The matting of this invention has none of such disadvantages. According to this invention there is provided a flexible matting consisting of a base sheet carrying a plurality of tread bars arranged in a definite direction and a plurality of ridges bearing piles arranged between the tread bars in the same direction as that of these bars, the height of said piles being larger than that of said tread bars, and the base sheet, tread bars, ridges, and piles being integrated to form the matting.

This invention is illustrated below in detail with reference to the accompanying drawings, in which FIG. 1 is a sketch of one example of the conventional mattings;

FIG. 5a to FIG. 5e are sectional views (corresponding to the sectional view at A-A' in FIG. 2) of various examples of the piles;

FIGS. 6a to 6e are sectional views (corresponding to the sectional view at A-A' in FIG. 2) of various examples of the tread bar 4; and FIGS. 7a and 7b illustrate the relations between the height of a ridge 2 and a tread bar 4.

Figure 1:
Figure 2:
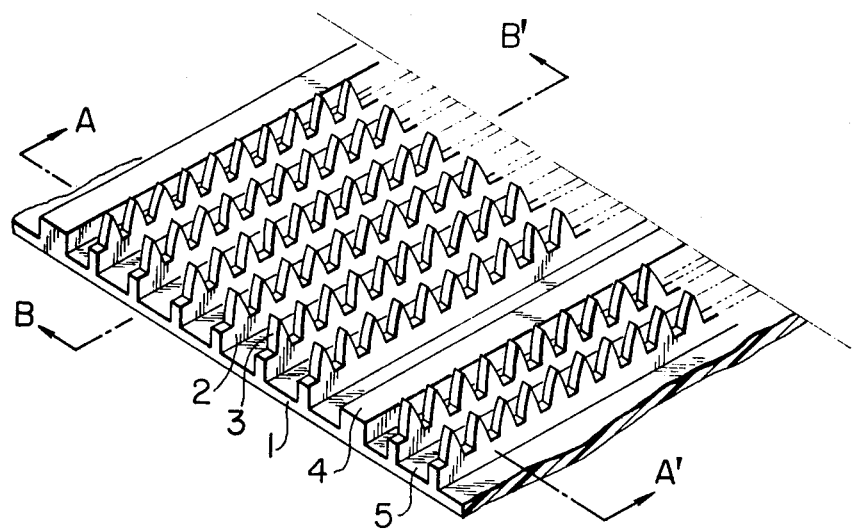
FIG. 2 is an oblique view of one of the embodiments of this invention.
Figure 3:
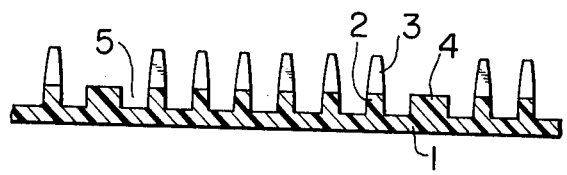
FIG. 3 is a sectional view at A-A' in FIG. 2.
Figure 4:
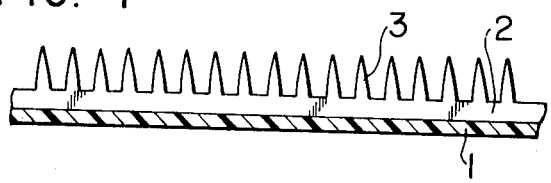
FIG. 4 is a sectional view at B-B' in FIG. 2.

The present matting is made of a synthetic resin such as, for example, an ethylene-vinyl acetate copolymer, polyethylene, polyvinyl chloride, acrylonitrile-butadiene-styrene copolymer, butadiene-styrene copolymer, or polystyrene; or a rubber; or a mixture of these materials. The present matting is made by integrally molding, as shown in FIGS. 2, 3 and 4, a base sheet 1, a plurality of ridges 2 bearing numerous piles 3 of an appropriate height and shape, and a plurality of tread bars 4, said ridges and tread bars having an optional width, height, and shape (provided that the top of the piles is in a level above that of the upper surface of the tread bars) and being arranged in a definite direction with appropriate spacings between them.

Without departing from the spirit and scope of this invention and without causing any injury to the merit thereof, the pile 3 and the tread bar 4 may be in a great variety of forms other than those shown in FIGS. 5a – 5e and 6a – 6e.

The present matting has favorable cushioning properties, because it is made of a flexible synthetic resin, rubber, or a mixture of these materials and the height of piles are larger than that of tread bars. Being formed on the ridges 2, the piles 3 are not subject to prostration or rupture due to repeated stamping, contrary to the case of conventional mattings, because if the piles 3 bend to some extent, the ridges 2 support the stamping load and if the piles bend further, the tread bars 4 support the load.

The effectiveness of ridges in keeping the piles from prostration is enhanced by arranging the wider tread bars at intervals of 3 to 15 cm, that is, shorter than the width of shoes. The prostration of piles is more effectively prevented and the cushioning properties are increased when the tread bars 4 are higher than the ridges 2 as shown in FIG. 7b, though some degrees of effectiveness are expected when the height is vice versa.

As for the cushioning properties, although favorable cushioning properties are obtained when the top of piles is in a level 2 mm or more higher than that of the upper surface of the tread bars 4, it is possible, if necessary, to increase said level difference up to about 15 mm, preferably 10 mm, particularly when a softer touch is required. Although cushioning properties of the matting are improved with an increase in said level difference, an increase of more than about 15 mm is not desirable for the use where repeated stamping is usual, because it will become difficult for the piles to recover from prostration.

Since the rows of ridges 2 and tread bars 4 of the present matting are arranged in a definite direction at proper intervals and the piles 3 are formed on the ridges 2, the mud removed from shoes by the piles accumulates in the grooves 5 and is discharged from the matting more easily as compared with a conventional matting having piles directly formed all over the base sheet.

If a thick and massive matting is required, it is possible to meet the requirement without increasing the thickness of the base sheet by regulating the heights and widths of the tread bars 4, ridges 2, and piles 3, thus resulting in saving of the material for forming a massive mud scraper resistant to prostration and rupture due to repeated stamping.

What is claimed is:

1. A flexible matting adapted for cleaning shoes comprising
    a one-piece mat of integrally molded flexible material inculding
    a base sheet,
    a plurality of tread bars substantially parallel to each other integrally molded to said base sheet at intervals shorter than the width of shoes,
    a plurality of ridges having piles thereon integrally molded to said base sheet and arranged at approximately equal intervals between and parallel to said tread bars with the width of the ridges narrower than the width of the tread bars and forming grooves between said ridges and said ridges and tread bars,
    whereby said ridges and piles have a flexibility requiring the support of said tread bars against an excessive pressing force on said ridges and piles,
    the top of said piles being approximately 2 to 15mm higher than the upper surface of said tread bars.

2. A flexible matting according to claim 1, wherein said matting is made of a synthetic resin selected from the group consisting of ethylene-vinyl acetate copolymers, polyethylene, polyvinyl chloride, acrylonitrile-butadiene-styrene copolymers, butadiene-styrene copolymers, and polyurethane.

3. A flexible matting according to claim 1, wherein said matting is made of a rubber.

4. A flexible matting according to claim 1, wherein said matting is made of a mixture of a synthetic resin and a rubber.

5. A flexible matting according to claim 4, wherein the synthetic resin is selected from the group consisting of ethylene-vinylacetate copolymers, polyethylene, polyvinyl chloride, acrylonitrile-butadiene-styrene copolymers, butadiene-styrene copolymers and polyurethane.

6. A flexible matting according to claim 1, wherein said ridge is lower than said tread bar.

7. A flexible matting according to claim 1, wherein said ridge is higher than said tread bar.

8. A flexible matting according to claim 1, wherein said piles have a rounded top surface in cross-section.

9. A flexible matting according to claim 1, wherein said piles have a pointed top in cross-section.

10. A flexible matting according to claim 1, wherein said piles have a rectangular shape with a rectangular projection on the top surface thereof in cross-section.

11. A flexible matting according to claim 1, wherein said piles are triangular shaped in cross-section.

12. A flexible matting according to claim 1, wherein said piles are rectangular shaped with a width similar to the width of said ridges in cross-section.

13. A flexible matting according to claim 1, wherein said tread bars are rectangularly shaped in cross-section.

14. A flexible matting according to claim 1, wherein said tread bars are trapezoidally shaped in cross-section.

15. A flexible matting according to claim 1, wherein said tread bars are triangularly shaped in cross-section.

16. A flexible matting according to claim 1, wherein said tread bars are rounded at the top in cross-section.

17. A flexible matting according to claim 16, wherein said tread bars have a semi-circular top surface in cross-section.

* * * * *